United States Patent [19]

Armstrong et al.

[11] Patent Number: 5,286,322
[45] Date of Patent: Feb. 15, 1994

[54] RAPID THERMAL PROCESSING OF MULTILAYER TAPES FOR FUEL CELL APPLICATIONS

[75] Inventors: Timothy R. Armstrong, Palos Verdes Pen, Calif.; Dawne M. Moffatt, Corning, N.Y.

[73] Assignee: Allied-Signal, Inc., Morris Township, Morris County, N.J.

[21] Appl. No.: 780,659

[22] Filed: Oct. 18, 1991

[51] Int. Cl.$^5$ ............................................. C04B 37/00
[52] U.S. Cl. ........................................ 156/89; 264/61; 264/66
[58] Field of Search .................. 156/89; 29/623.3; 429/30, 34; 264/61, 66

[56] References Cited

U.S. PATENT DOCUMENTS

| | | | |
|---|---|---|---|
| 4,035,266 | 7/1977 | Alexandrov et al. | 252/512 |
| 4,598,467 | 7/1986 | Isenberg et al. | 29/623.5 |
| 4,631,238 | 12/1986 | Ruka | 429/30 |
| 4,706,163 | 11/1987 | Maher | 264/61 |
| 4,816,036 | 3/1989 | Kotchick | 29/623.3 |
| 4,861,345 | 8/1989 | Bowker et al. | 29/623.1 |
| 4,895,576 | 1/1990 | Pal et al. | 29/623.5 |
| 5,010,443 | 4/1991 | Maher | 264/61 |
| 5,102,592 | 4/1992 | McCauley et al. | 264/56 |

*Primary Examiner*—Jan H. Silbaugh
*Assistant Examiner*—Christopher A. Fiorilla
*Attorney, Agent, or Firm*—R. A. Walsh

[57] ABSTRACT

A method of constructing a fuel cell includes a sintering technique that improves the structure and performance of the fuel cell elements. The method includes furnishing a fuel cell core comprising trilayers of anode, cathode, and interconnect layers, and trilayers of anode, cathode, and electrolyte layers. Each of the layers has a mixture of the respective anode, cathode, or interconnect ceramic material mixed with processing aid materials including a binder and a plasticizer, and, in the case of the interconnect mixture, optionally a flux. This partially fabricated fuel cell core is sintered to form a monolithic structure, the step of sintering being performed by heating the core at a heating rate of greater than about 40° C. per minute to a sintering temperature of from about 1550° to about 1600° C., maintaining the core at the sintering temperature for a time of from about 5 to about 20 minutes, and cooling the sintered structure.

12 Claims, 5 Drawing Sheets

RAPID THERMAL PROCESSING OF MULTILAYER TAPES FOR FUEL CELL APPLICATIONS

BACKGROUND OF THE INVENTION

This invention relates to solid oxide fuel cells having a ceramic trilayer construction and, more particularly, to the sintering of the final structure.

A fuel cell is an electrochemical conversion device that chemically reacts a fuel, such as hydrogen or a hydrocarbon, with an oxidizer in an elevated temperature, catalytic environment. The hydrogen reacts with the oxygen to produce carbon dioxide and water, and an electrical current through an external circuit to provide power. The fuel cell provides a structure having internal passageways that permit the fuel and oxidizer to interdiffuse at a controlled rate to produce this reaction.

Several designs of fuel cells have been utilized in the past. In one popular approach, a support tube provides the structural support for electrochemically active layers of cathode, electrolyte, and anode materials deposited on the exterior surface of the support tube. The oxidant flows on the interior of the tube, and the fuel flows on the exterior of the tube. The reaction between the two in the active layers produces the electrical current. A typical fuel cell of this type would utilize a number of such elements operating in series to obtain higher voltages or in parallel to obtain higher currents.

Such tubular designs have structural and operating limitations, and a number of modifications have been made to improve their performance. Dimensions and compositions have been optimized, the elements have been arranged in various configurations, and the active layers have been interconnected in different ways between elements. However, there remained fundamental limits to fuel cell performance.

As a result, other fuel cell designs have been developed. In one alternative approach, the active materials are formed as slurries and painted onto a surface. This approach reduces the weight and improves the ability to control the thickness and location of the active materials.

In another approach, a fuel cell is fabricated using a monolithic structure wherein the separate support structure is largely eliminated. In this design, the active materials themselves provide the structural strength required for integrity of the fuel cell. In one successful design, described in U.S. Pat. No. 4,816,036, the powders of the ceramic materials utilized in active anode, cathode, electrolyte, and interconnects are separately mixed with a binder and a plasticizer to form a slurry, each of which is then processed into a tape form. The tapes are combined in trilayer form as trilayer electrolyte walls and trilayer interconnect walls. The trilayer walls in turn are assembled to form a fuel cell element, which is sintered to form a monolithic structure. In this monolithic fuel cell, the sintered trilayers provide not only the electrochemically active material but also the structure for the fuel cell.

The trilayer monolithic fuel cell approach has been successful. However, it has been observed that, although the electrical and mechanical properties of the fuel cell are good, in theory they might be made even better. That is, it may be possible to increase both the electrical properties, in the form of electrical conductivity and output current density, and mechanical properties, in the form of fuel cell structural strength.

Thus, there is always an ongoing need for improving the characteristics of such fuel cells. The present invention fulfills this need, and further provides related advantages.

SUMMARY OF THE INVENTION

The present invention provides a method for constructing a fuel cell of the trilayer type that has increased electrical conductivity and output current density, as compared with those similarly manufactured but not utilizing the processing approach of the invention. The manufacturing process of the fuel cell is also faster than that used for prior similarly configured fuel cells.

In accordance with the invention, a method of constructing a fuel cell utilizes a sintering technique that improves the structure and performance of the fuel cell elements. The method includes furnishing a fuel cell core comprising trilayers of anode, cathode, and interconnect layers, and trilayers of anode, cathode, and electrolyte layers. Each of the layers has a mixture of the respective anode, cathode, electrolyte, or interconnect ceramic material mixed with processing aid materials comprising a binder and a plasticizer. In the case of the interconnect mixture, a flux may optionally be added. This partially fabricated fuel cell core is sintered to form a monolithic structure, the step of sintering being performed by heating the core at a heating rate of greater than about 40° C. per minute to a sintering temperature of from about 1550° to about 1600° C., maintaining the core at the sintering temperature for a time of from about 5 to about 20 minutes, and cooling the sintered structure.

More specifically in relation to a preferred embodiment, the fuel cell core and manifolding are fabricated by mixing anode, cathode, electrolyte and interconnect powders separately with processing aid materials comprising a binder and a plasticizer (and optionally a flux in the interconnect mixture), to form four separate batches of anode, cathode, electrolyte and interconnect materials. The mixtures are individually formed into a separate flexible tape of each material with the desired width and thickness. Two flexible trilayer tapes of desired thickness are formed, one trilayer tape comprising a layer of electrolyte material sandwiched between an anode tape and a cathode tape, and the other trilayer tape comprising an interconnect tape sandwiched between an anode tape and a cathode tape. The two trilayer tapes are cut to length, at least one trilayer tape is molded to a desired shape, the trilayer tapes are stacked to form the fuel cell core and manifolding, and the binder is extracted from each tape. The stack (core and manifolding) is sintered to form a monolithic structure in the manner described above, by heating the core and manifolding at a heating rate of greater than about 40° C. per minute to a sintering temperature of from about 1550° to about 1600° C., maintaining the core and manifolding at the sintering temperature for a time of from about 5 to about 20 minutes, and then cooling the sintered structure.

In the past, it has been the practice to slowly heat the stack of trilayer tapes at a rate of about 2° C. per minute, to a temperature of 1350° C., and to maintain that temperature for about one hour before cooling. With the present invention, the stack of trilayer tapes is heated at a higher rate to a higher temperature, and maintained for a much shorter time at that temperature. If there is a tendency for the structure to be damaged by thermal shock caused by the high heating rate and a mismatch in thermal expansion coefficients, microwave or forced gas convection heating may be used to sinter the fuel cell.

The result of this sintering procedure is that the interconnect layer is more fully densified than in the prior approach. The interconnect layer therefore has better mechanical properties and is more impermeable to gas than achieved with the prior approach. Moreover, with the prior approach there is a substantial amount of interdiffusion of chemical species between the various layers of the trilayers. The present method of heating faster and holding at temperature for a shorter time reduces that interdiffusion, even though the sintering temperature is higher with the present procedure.

The present invention thus provides an advance in the art of preparing fuel cells. Other features and advantages will be apparent from the following more detailed description of the preferred embodiment, taken in conjunction with the accompanying drawings, which illustrate, by way of example, the principles of the invention.

DETAILED DESCRIPTION OF THE PREFERRED EMBODIMENTS

In accordance with the invention, a method of constructing a fuel cell comprises the steps of mixing powders with processing aid materials comprising a binder and a plasticizer to form at least four separate batches of materials, forming a separate, flexible tape of each material, and forming two flexible multilayer tapes, each multilayer tape comprising at least three separate, flexible tapes. The method further includes cutting said two flexible multilayer tapes to size, molding at least one of the multilayer tapes to form a fuel cell core and manifolding, extracting said binder from each multilayer tape, and sintering the core and manifolding to form a monolithic structure. The step of sintering is performed by heating the core and manifolding at a heating rate of greater than about 40° C. per minute to a sintering temperature of from about 1550° to about 1600° C., maintaining the core and manifolding at the sintering temperature for a time of from about 5 to about 20 minutes, and cooling the sintered structure.

The structure of a fuel cell of the type prepared according to the present invention, and aspects of the mechanical fabrication of the fuel cell, are disclosed in U.S. Pat. No. 4,816,036, whose disclosure is incorporated by reference as though set forth fully herein.

Figure 1:
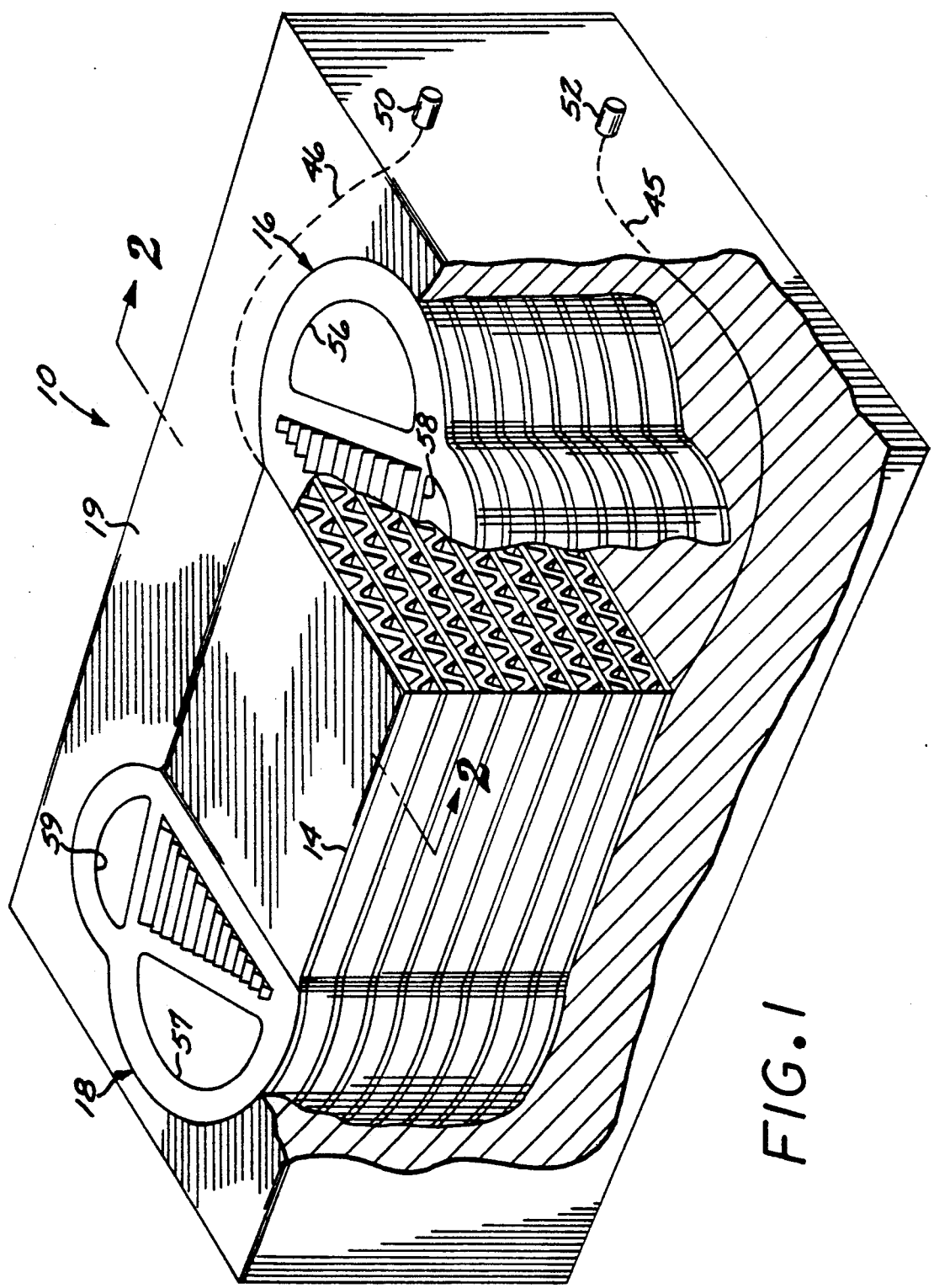
FIG. 1 is a perspective view, partially broken away for clarity, of a fuel cell formed according to the present invention.

FIG. 1 is a monolithic solid oxide fuel cell 10 including a fuel cell core 14 and inlet and outlet manifolding 16 and 18, at each end of the core 14. The core and manifolds are located within and surrounded by suitable insulation.

Figure 2:
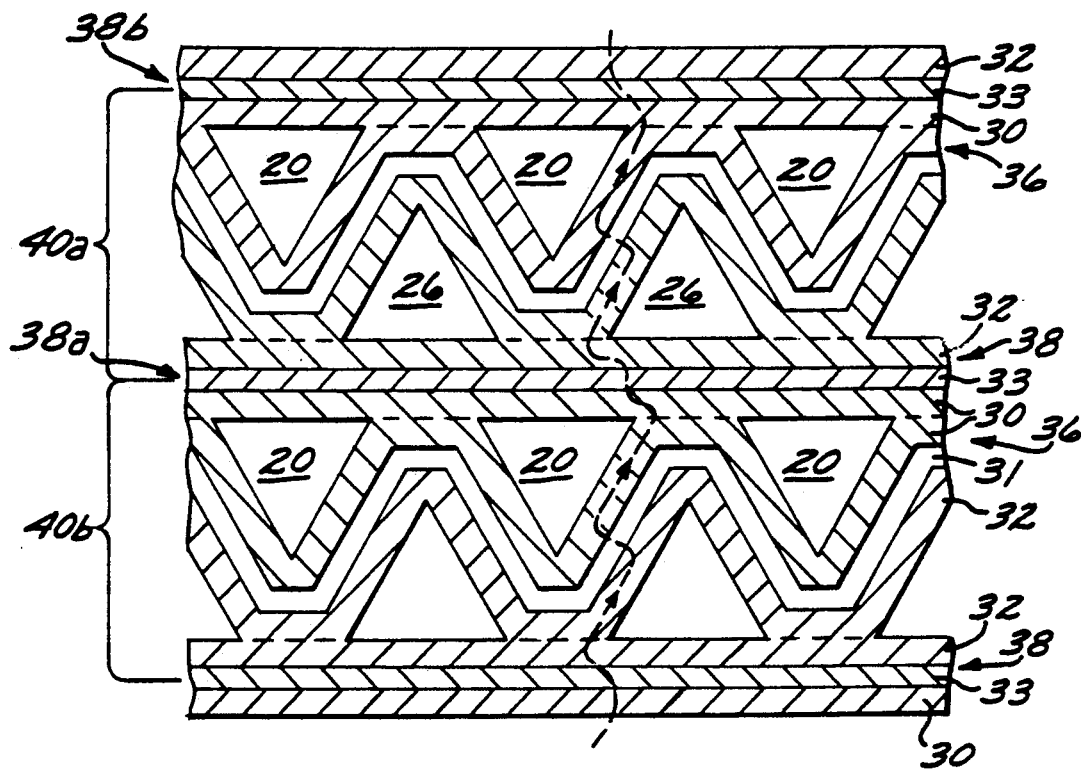
FIG. 2 is a partial, enlarged sectional view taken along line 2—2 of FIG. 1.

FIG. 2 illustrates an enlarged cross-section of the core 14 for the fuel cell 10 of FIG. 1. Within core 14 are formed a plurality of fuel passageways 20 and oxidant passageways 26 which are disposed parallel to one another and alternately adjacent one another. The passageways 20 for the fuel are formed with only an anode material 30 defining the exposed passageway walls, while the passageways 26 for the oxidant are formed with only a cathode material 32 defining the exposed passageway walls. Adjacent cell passageways 20 and 26 are separated by either an electrolyte wall 30 or by an interconnect wall 38. The electrolyte wall portion 36 comprises a thin trilayer of electrolyte material 31 between the anode material 30 and the cathode material 32. The interconnect wall 38 comprises a thin trilayer of interconnect material between the anode and cathode materials 30 and 32. Two interconnect walls 38 can define the limit of one "cell" unit 40. However, in the overall fuel cell 10, two adjacent cell units 40 share an interconnect wall 38.

The anode, cathode, electrolyte, and interconnect materials are selected and modified to comply with the following requirements: (1) electrically conductive aspects of the cathode, anode, and interconnect; (2) the ionic transport and electronic insulation aspect of the electrolyte; and (3) the porous nature of the cathode and anode and the gas impervious character of the electrolyte and interconnect. Likewise, the structural integrity, thermal expansion and contraction ratios, and chemical compositions of the composite monolithic core are designed for the specific operational parameters of temperature, pressure, gas flow rates, voltage, and current densities necessary to provide optimal efficiency.

In a preferred embodiment of the fuel cell, the interconnect and the electrolyte layers are thin (0.002–0.005 cm) while the sandwiching cathode and anode layers are about the same thickness or possibly up to about ten times this thickness (0.002–0.05 cm).

The monolithic core provides increased power density due to the increased active exposure areas of fuel and oxidant per the corresponding unit flow path volume, and due further to having only the active materials (the anode, cathode, electrolyte, and interconnect) in the core. The fuel and oxidant passageways 20 and 26 of the core can be very small, and likewise the core walls can be thin but yet self supporting over the small distances across the defined passageways, making possible shorter current paths and reduced resistance losses, and minimizing diffusion losses by eliminating thick support tubes entirely.

The manifolds 16 and 18 each include an oxidant passageway 58, 59 and a fuel passageway 56, 57. The fuel cell can be used with either parallel flow or counter flow of the two working fluids. For the purpose of clarity it is assumed that a parallel flow system is being used and therefore manifold 16 will be referred to as the inlet manifold defining a fuel inlet conduit 56 and an oxidant inlet conduit 58, and manifold 18 will be referred to as the outlet manifold defining a fuel outlet conduit 57 and an oxidant outlet conduit 59.

Gaseous hydrogen or hydrocarbon fuel is conveyed from a source (not shown) to the fuel inlet conduit 56 formed within the inlet manifold 16 for flow through the passageways 20 in the core 14 toward the fuel outlet conduit 57 formed within the outlet manifold 18. Likewise, oxidant is carried from a source (not shown) to the oxidant inlet conduit 58 formed within the inlet manifold 16 and through the oxidant passageways 26 toward the oxidant outlet conduit 59 formed within the outlet manifold 18. The fuel and oxidant react electrochemically across the electrolyte walls 36 separating the fuel and oxidant in the core 14. Fuel and oxidant not consumed in the core are discharged through the outlet manifold 18 and subsequently may be recycled or combusted in an appropriate combustion chamber (not shown) to provide heat.

As shown in FIG. 2, each electrolyte wall 36 is comprised of the layer of electrolyte 31 sandwiched between the layers of anode 30 and cathode 32. Electrolyte wall 36 electrochemically reacts the fuel and oxidant being conveyed in the passageways 20 and 26, respectively, to develop an electrical potential across the electrolyte wall 36. Further, for all of the electrolyte walls thus confined between any pair of adjacent interconnect walls (38a and 38b, for example), there is a series electrical hookup of these cell units (40a and 40b, for example). The electrolyte walls 36 are alternated or backfolded in effect between the interconnect walls 38 so that the fuel and oxidant passageways 20 and 26 are likewise alternately disposed between any pair of adjacent interconnect walls.

The cathode 32 and anode 30 layers of the electrolyte walls 36 are porous to the degree required to allow the fuel and oxidant gases confined on the opposite sides thereof to be transported to the electrode/electrolyte interface, while the electrolyte material 31 and the interconnect material 33 in the electrolyte and interconnect walls are impervious and serve to isolate the fuel and oxidant gases completely from one another. Likewise, the electrolyte material 31 does not conduct electrons, so that electrons do not pass between the cathode and anode layers formed on opposite sides of the electrolyte, but the electrolyte material 31 does provide ionic conductivity for oxygen ion transfer between the cathode and anode. Moreover, both the cathode and anode layers, 32 and 30, are electrically conductive. The interconnect material 33 allows electrons to pass through it, thereby electrically connecting the anode material 30 and the cathode material 32 of the cells on opposite sides of the electrolyte wall 36 together to provide a series connection of adjacent cells.

In a practical fuel cell of the type shown in FIGS. 1 and 2, many serially connected cells 40a, 40b, etc. may be provided. The outermost interconnect walls or the series connections between interconnect walls are connected electrically via conductors 45 and 46 to external terminals 50 and 52 of the fuel cell to provide a cumulative electrical output at the terminals. The conductors 45 and 46 may be connected to the lowermost anode or overlying interconnect material 33, and the uppermost cathode or interconnect material. In this manner, the overall fuel cell voltage at the exterior terminals 50 and 52 may be on the order of 10-100 volts. As the conductors 45, 46 will typically be formed of a high temperature conductive metal, it is advantageous to have the conductors in a fuel environment (rather than an oxidizing environment) or to bleed a small amount of fuel over the conductors so as to minimize their oxidation.

Additional details regarding fuel cell design and construction may be found in the previously referenced U.S. Pat. No. 4,816,036.

Figure 3:
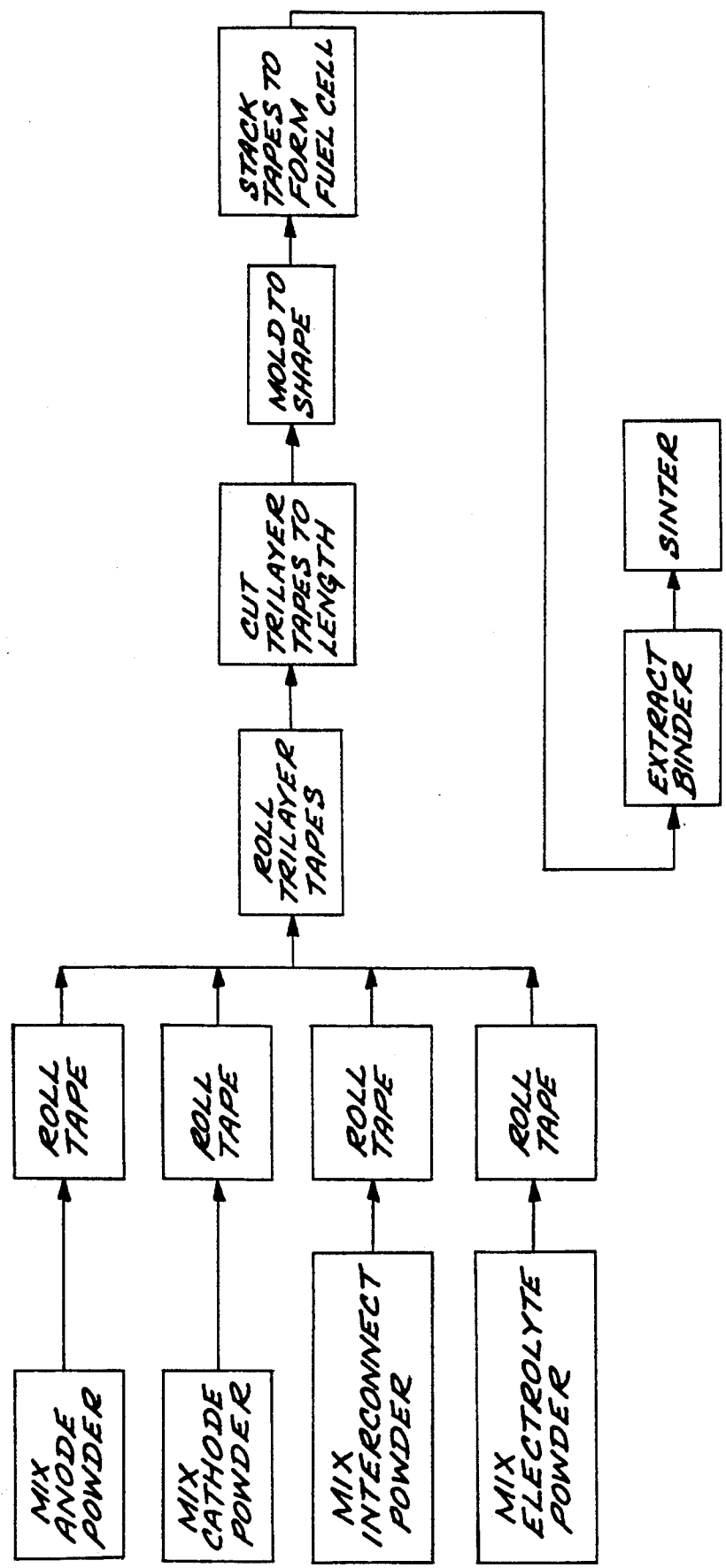
FIG. 3 is a flow chart of the steps of the present invention.

FIG. 3 presents a block diagram of the preferred process of the invention to manufacture a fuel cell of the type just described. Ceramic powders for each of the materials of construction are first prepared. The preferred materials are strontium lanthanum maganite for the cathode, yttria-stabilized zirconia for the electrolyte, calcium-cobalt doped lanthanum chromite for the interconnect and a cermet of cobalt or nickel metal with stabilized zirconia for the anode. Preferably, the particle sizes range from about 1 micron to about 100 micrometers. Porosity can be increased by using larger particle sizes, if desired, or by the use of a higher percentage of binder than otherwise used. The powder is then mixed with processing aid materials comprising a binder, a plasticizer, and, in the case of the interconnect optionally a flux, in a high intensity mixer.

Typically, the binder used can be selected from the group comprising synthetic rubber, thermosetting plastic, polyvinyl alcohol or polymer systems which thermally decompose without cross-linking. The plasticizer is pliable, elastic, and allows low-temperature forming of the binder system. Examples of acceptable plasticizers are butyl benzyl phthalate and solvents of the phthalate. The flux, when used in the interconnect mixture, is preferably a mixture of calcium oxide (CaO) and boron oxide ($B_2O_3$). Other operable fluxes include binary borate systems with barium oxide, cobalt oxide, and zinc oxide.

In a preferred approach, the cathode mixture comprises about 100 parts by weight of strontium lanthanum maganite powder, mixed with from about 10 to about 40 parts by weight of a mixture of equal parts of a binder and a plasticizer.

In the preferred approach, the anode mixture comprises 100 parts yttria-stabilized zirconia plus nickel oxide, mixed with from about 10 to about 40 parts by weight of a mixture of equal parts of a binder and a plasticizer.

In the preferred approach, the electrolyte mixture comprises about 87 parts by weight of zirconia and about 13 parts by weight of yttria, mixed with from about 10 to about 40 parts by weight of a mixture of equal parts of a binder and a plasticizer.

In the preferred approach, the interconnect mixture comprises about 70 parts by weight of lanthanum chromite doped with about 30 parts by weight of calcium cobalt, mixed with from about 10 to about 40 parts by weight of a mixture of equal parts of a binder and a plasticizer. Optionally, from about 0.5 to about 5 parts by weight of the flux may be present.

The powder, binder, and plasticizer are combined in a high intensity mixer at room temperature. The mixing disperses the powder particles and coats each particle with binder. The mixing action also raises the temperature through friction to about 150° C. and softens the binder. Typically, the time for mixing can be 0.5 to 20 minutes with 10 minutes generally being sufficient.

The mixed material is removed from the mixer and rolled, preferably immediately after mixing to retain the heat generated by the mixing, in a roll mill. Each roller is generally heated to about 10°-150° C., depending upon the composition of the rolled material, to assist in the rolling operation. Each of the anode, cathode, electrolyte, and interconnect material mixtures is roll milled into a tape of the desired thickness.

Thereafter, a trilayer tape laminate is roll milled from three of the other tapes. One type of multilayer tape has the tape of the electrolyte material sandwiched between the tape of the cathode material and the anode material. The other type of multilayer tape has the tape of the interconnect material sandwiched between the tape of the cathode material and the anode material. During this step each tape is friction bonded to the adjacent tape or tapes. It is important that no voids are formed between the tape layers during this rolling step. The resulting trilayer tape may be further calendered if required to reduce its thickness.

In order to increase the efficiency of the fuel cell it is advantageous, but not necessary, to corrugate the electrolyte tape to achieve greater active area. This can be accomplished by compression molding, vacuum forming, or by gear forming. It is important to avoid material flow during corrugation, to retain the desired layer thickness.

Before stacking, the fuel cell core in its green state is solution treated with any solvent (e.g., alcohol) which will assist in dissolving the binder. Once the trilayer tapes are cut to size and the electrolyte tape has been subjected to the desired forming process, the individual layers are alternately stacked to form the fuel cell core 14.

Binder extraction is done in a furnace by uniformly heating the core slowly up to approximately 540 C., depending upon the binder used, so that the binder changes into a gaseous phase. The heating rate is important in that it must be slow enough not to cause blistering or the formation of gas pockets between the multilayered tapes. The binder extraction step removes all but a small amount of residues (typically about 1 percent by weight of the total binder) and results in approximately 0–10 percent linear shrinkage. After the binder has been removed the core 14 can either be cooled or moved directly into the sintering furnace.

Sintering is typically accomplished in a vacuum or oxidizing atmosphere in a suitable furnace. The core, from which the binder has been removed, is heated at a rate of at least about 40° C. per minute, and desirably at a rate of at least about 100° C. per minute, to a sintering temperature of from about 1550° to about 1600° C. The core is held at this temperature for a sintering time of from about 5 to about 20 minutes, and then cooled to room temperature.

The heating rate to the sintering temperature, the sintering temperature, and the sintering time are all important in attaining a high quality finished part. If the heating rate is too low, the total processing time may exceed 72 hours. If the sintering temperature is too low or the sintering time too short, the interconnect does not fully densify. If the sintering temperature is too high or the sintering time too long, there is an unacceptably high interdiffusion of constituents between various tapes.

In the prior approach to sintering of composite tapes, a sintering temperature of 1350° C. and a sintering time of one hour were used. The result was incomplete densification of the interconnect layer and excessive interdiffusion of the chemical species throughout the tapes. This resulted in poor mechanical integrity of the fuel cell. Also, the interconnect layer was not sufficiently impervious to gas (i.e., gas tight), allowing cross leakage and reaction of the fuel and oxidant and resulting in a lower fuel cell current density. With the present approach, more complete densification of the interconnect layer is achieved, with less interdiffusion.

Figure 4A:
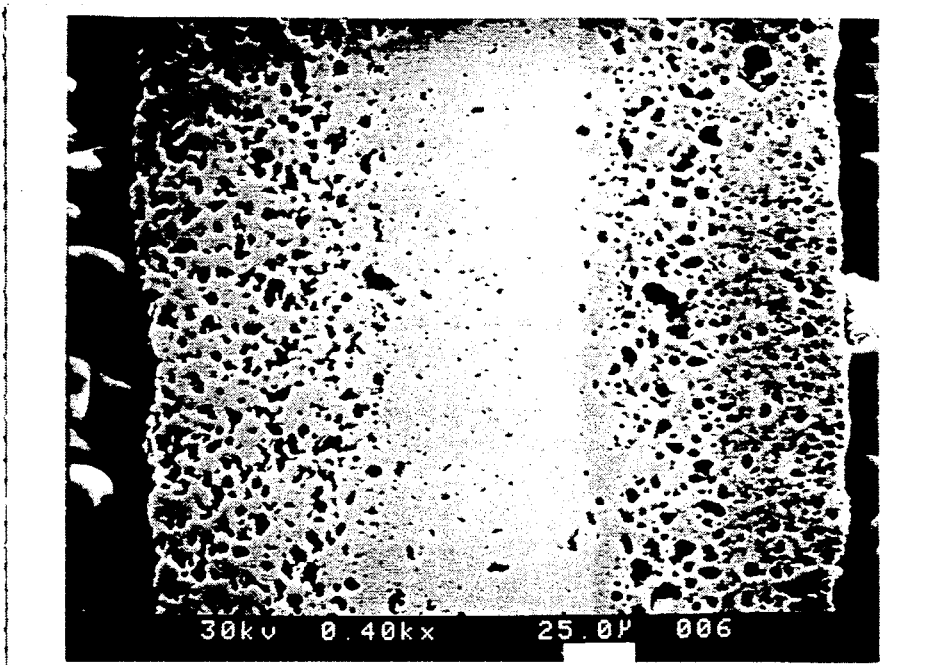
FIG. 4 is two scanning electron micrographs of trilayer tapes, with FIG. 4A a trilayer tape prepared by the present approach and FIG. 4B a trilayer tape prepared by the prior approach.
Figure 4B:
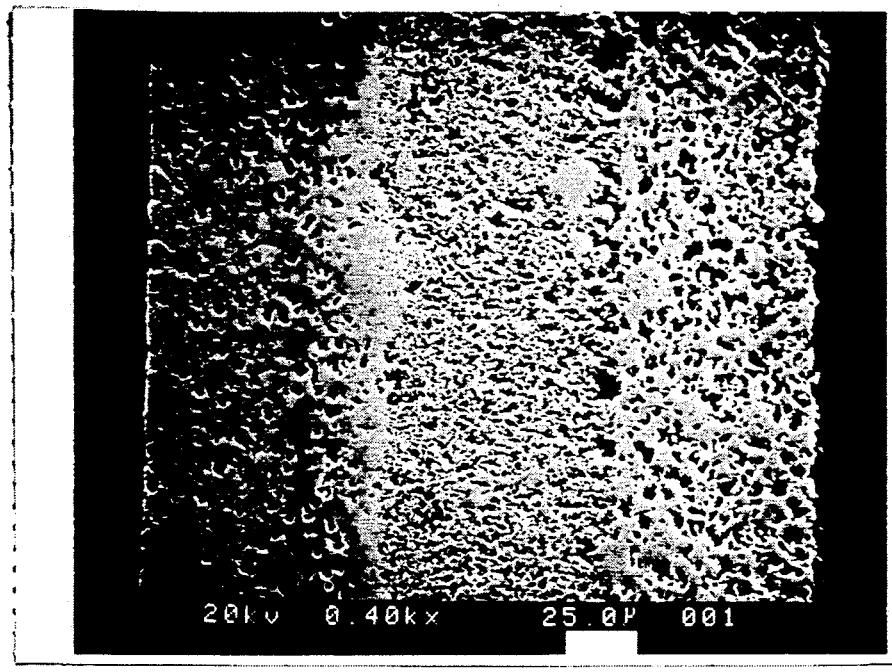

FIG. 4A is a scanning electron micrograph of a trilayer tape prepared by the present approach, illustrating substantially complete densification of the interconnect layer. FIG. 4B is a similar scanning electron micrograph of a trilayer tape prepared by the prior approach, illustrating incomplete densification of the interconnect layer.

Figure 5:
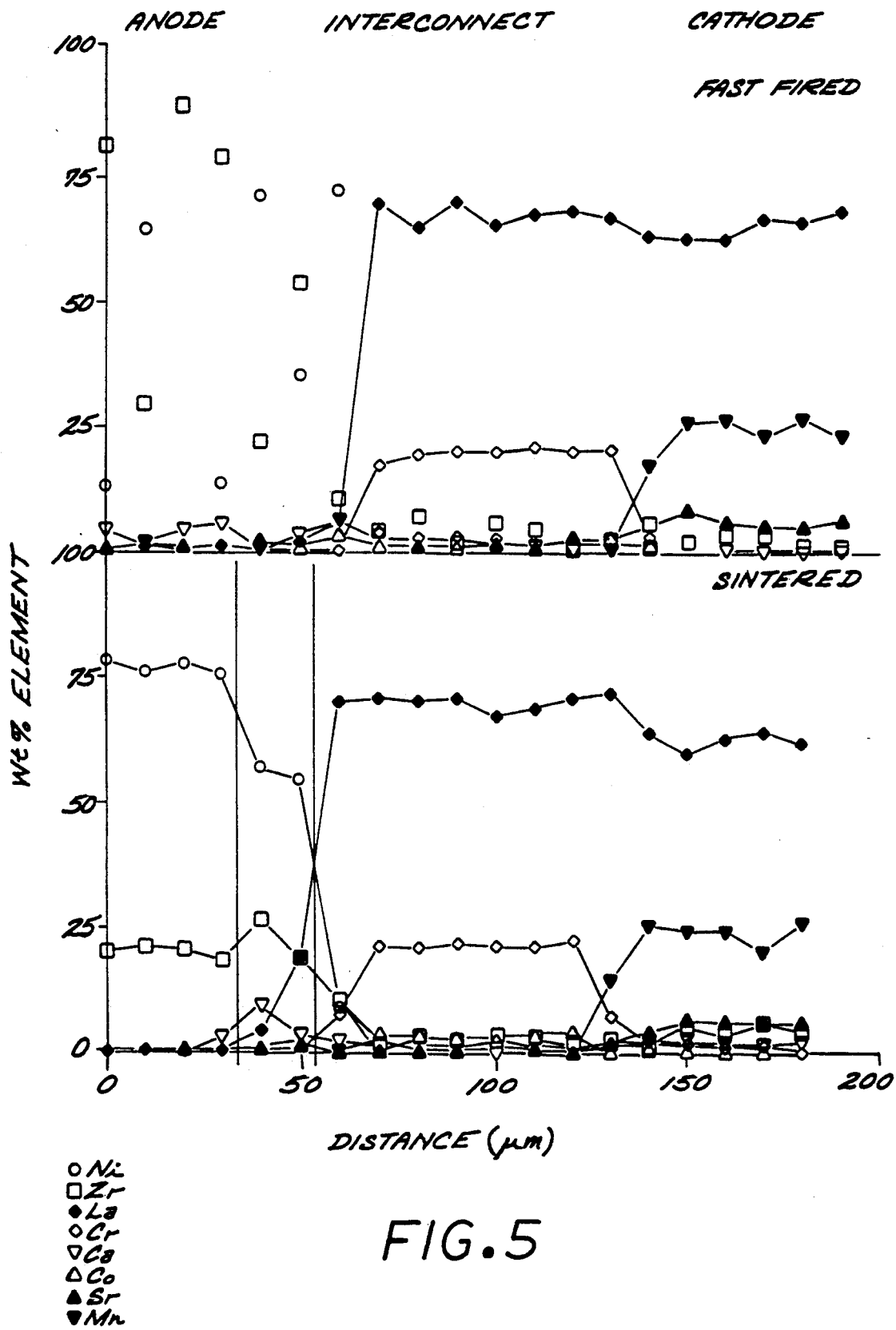
FIG. 5 is a superposition of two graphs of composition as a function of distance across two trilayer tapes, the upper portion being for a tape prepared by the present approach and the lower portion being for a tape prepared by the prior approach.

FIG. 5 presents chemical analyses of the trilayer tapes shown in FIG. 4. The upper portion of the graph relates to the trilayer tape prepared by the present approach, and the lower portion of the graph relates to the trilayer tape prepared by the prior approach. There is less interdiffusion of calcium and zirconium in the trilayer tape prepared by the present approach than in the trilayer tape prepared by the prior approach.

The present approach thus provides an advance in the preparation of trilayer tapes for use in fuel cells. Although particular embodiments of the invention have been described in detail for purposes of illustration, various modifications may be made without departing from the spirit and scope of the invention. Accordingly, the invention is not to be limited except as by the appended claims.

What is claimed is:

1. A method of constructing a fuel cell, comprising the steps of:
   mixing powders required to make an anode, a cathode, an electrolyte, and an interconnect material separately with processing aid materials comprising a plasticizer and a binder to form a batch of each of said materials;
   rolling each batch of said materials into a tape having a desired width and thickness;
   rolling the tape of anode and the tape of cathode material on each side of said tape of electrolyte and interconnect materials, thereby forming a trilayer electrolyte wall and a trilayer interconnect wall;
   cutting said trilayer tapes to length;
   molding at least one of said trilayer tapes into a desired shape;
   alternately stacking the two trilayer tapes to the desired height to form a fuel cell core;
   extracting the binder from the core; and
   sintering the core to form the monolithic fuel cell core, the step of sintering being performed by
      heating the core at a heating rate of greater than about 40° C. per minute to a sintering temperature of from about 1550° to about 1660° C.,
      maintaining the core at the sintering temperature for a time of from about 5 to about 20 minutes, and
      cooling the sintered structure.

2. The method of claim 1, wherein the processing aid materials for the interconnect mixture further comprise a flux.

3. The method of claim 2, wherein the flux is a CaO-$B_2O_3$ flux.

4. A method of constructing a fuel cell, comprising the steps of:
   mixing anode, cathode, electrolyte and interconnect powders separately with processing aid materials comprising a binder and a plasticizer to form four separate batches of an anode, cathode, electrolyte and interconnect material;
   forming a separate flexible tape of each material with the desired width and thickness;
   forming two flexible trilayer tapes of desired thickness, one trilayer tape comprising a layer of electrolyte material sandwiched between an anode tape and a cathode tape, and the other trilayer tape comprising an interconnect tape sandwiched between an anode tape and a cathode tape;

cutting said two trilayer tapes to length;

molding at least one trilayer tape to the desired shape;

alternating stacking said trilayer tapes to form a fuel cell core and manifolding;

extracting said binder from each tape; and sintering the core and manifolding to form a monolithic structure, the step of sintering being performed by heating the core and manifolding at a heating rate of greater than about 40° C. per minute to a sintering temperature of from about 1550° to about 1600° C., maintaining the core and manifolding at the sintering temperature for a time of from about 5 to about 20 minutes, and cooling the sintered structure.

5. The method of claim 4, wherein the processing aid materials for the interconnect mixture further comprises a flux.

6. The method of claim 5, wherein the flux is a CaO-$B_2O_3$ flux.

7. A method of constructing a fuel cell, comprising the steps of:

mixing powders with processing aid materials comprising a binder and a plasticizer to form at least four separate batches of materials;

forming a separate, flexible tape of each material;

forming two flexible multilayer tapes, each multilayer tape comprising at least three separate, flexible tapes;

cutting said two flexible multilayer tapes to size;

molding at least one of said multilayer tapes to form a fuel cell core and manifolding;

extracting said binder from each multilayer tape; and sintering the core and manifolding to form a monolithic structure, the step of sintering being performed by heating the core and manifolding at a heating rate of greater than about 40° C. per minute to a sintering temperature of from about 1550° to about 1600° C., maintaining the core and manifolding at the sintering temperature for a time of from about 5 to about 20 minutes, and cooling the sintered structure.

8. The method of claim 7, wherein the processing aid materials for the interconnect mixture further comprise a flux.

9. The method of claim 8, wherein the flux is a CaO-$B_2O_3$ flux.

10. A method of constructing a fuel cell, comprising the steps of:

furnishing a fuel cell core comprising trilayers of anode, cathode, and interconnect layers, each of the layers comprising a mixture of the respective anode, cathode, or interconnect ceramic material mixed with processing aid materials comprising a binder and a plasticizer, and trilayers of anode, cathode, and electrolyte layers, each of the layers comprising a mixture of the respective anode, cathode, or electrolyte ceramic material mixed with processing aid materials comprising a binder and a plasticizer; and sintering the core to form a monolithic structure, the step of sintering being performed by heating the core at a heating rate of greater than about 40° C. per minute to a sintering temperature of from about 1550° to about 1600° C., maintaining the core at the sintering temperature for a time of from about 5 to about 20 minutes, and cooling the sintered structure.

11. The method of claim 10, wherein the processing aid materials for the interconnect mixture further comprise a flux.

12. The method of claim 11, wherein the flux is a CaO-$B_2O_3$ flux.

* * * * *